US012451757B2

(12) United States Patent
Blösch

(10) Patent No.: US 12,451,757 B2
(45) Date of Patent: Oct. 21, 2025

(54) PHASE CONNECTION BETWEEN AN INVERTER OR CONVERTER AND AN ELECTRIC MACHINE, TOGETHER WITH A METHOD FOR ESTABLISHING AN ELECTRICAL CONNECTION, AND ELECTRICAL DRIVE DEVICE

(71) Applicant: Vitesco Technologies Germany GMBH, Regensburg (DE)

(72) Inventor: Christoph Blösch, Bubenreuth (DE)

(73) Assignee: Vitesco Technologies Germany GmbH, Regensburg (DE)

(*) Notice: Subject to any disclaimer, the term of this patent is extended or adjusted under 35 U.S.C. 154(b) by 207 days.

(21) Appl. No.: 18/364,565

(22) Filed: Aug. 3, 2023

(65) Prior Publication Data
US 2023/0378844 A1 Nov. 23, 2023

Related U.S. Application Data

(63) Continuation of application No. PCT/EP2022/052937, filed on Feb. 8, 2022.

(30) Foreign Application Priority Data

Feb. 10, 2021 (DE) .................... 10 2021 201 264.7

(51) Int. Cl.
*H02K 5/22* (2006.01)
*B60L 15/00* (2006.01)
*H02K 11/33* (2016.01)

(52) U.S. Cl.
CPC ............ *H02K 5/225* (2013.01); *B60L 15/007* (2013.01); *H02K 11/33* (2016.01); *B60L 2210/40* (2013.01)

(58) Field of Classification Search
CPC .......... H02K 5/22; H02K 5/225; H02K 11/30; H02K 11/33; B60L 15/007; B60L 2210/40
See application file for complete search history.

(56) References Cited

U.S. PATENT DOCUMENTS 6,201,365 B1* 3/2001 Hara .................. B60L 1/02
903/952
2007/0207652 A1 9/2007 Tsurut
(Continued)

FOREIGN PATENT DOCUMENTS

CN 205336020 U 6/2016
CN 109983659 A1 7/2019
(Continued)

OTHER PUBLICATIONS

Kondo, Machine Translation of CN110611215, Dec. 2019 (Year: 2019).*
(Continued)

*Primary Examiner* — Eric Johnson

(57) ABSTRACT

A phase connection for electrically conductively connecting an inverter to a busbar of an electric machine, having a housing part having a housing wall, the housing wall having a first side and a second side that is different from the first side, and an opening extending between the first side and the second side being formed in the housing wall, and having a load busbar which is routed through the opening and has a first connecting section which is routed beyond the first side and is formed at least in sections from soft-annealed copper and/or contains soft-annealed copper.

12 Claims, 2 Drawing Sheets

(56) References Cited

U.S. PATENT DOCUMENTS

| | | |
|---|---|---|
| 2014/0170878 A1 | 6/2014 | Jocham |
| 2018/0031612 A1 | 2/2018 | Blaes |
| 2019/0104634 A1 | 4/2019 | Hasija |
| 2020/0366026 A1 | 11/2020 | Siddiqui |

FOREIGN PATENT DOCUMENTS

| | | | | |
|---|---|---|---|---|
| CN | 110611215 A | * | 12/2019 | ............ G01M 3/06 |
| DE | 102007008098 A1 | | 10/2007 | |
| DE | 102012223431 A1 | | 6/2014 | |
| DE | 102015216567 A1 | | 3/2016 | |
| DE | 102015202770 A1 | | 8/2016 | |
| DE | 102015213439 A1 | | 1/2017 | |
| DE | 102016222611 A1 | | 5/2018 | |
| EP | 2218915 A1 | | 8/2010 | |
| JP | 2008245461 A | | 10/2008 | |
| JP | 2010130803 A | | 6/2010 | |
| JP | 2012182051 A | | 9/2012 | |
| JP | 2019071271 A | | 5/2019 | |

OTHER PUBLICATIONS

Kikuchi, Machine Translation of JP2008245461, Oct. 2008 (Year: 2008).*

Blaes, Machine Translation of DE102015216567, Mar. 2016 (Year: 2016).*

Weidner, Machine Translation of DE102015213439, Jan. 2017 (Year: 2017).*

Japanese Office Action dated Jul. 2, 2024 for corresponding Japanese Patent Application No. 2023-548323.

International Search Report and Written Opinion dated Jun. 14, 2022 from corresponding International Patent Application No. PCT/EP2022/052937.

German Office Action dated Jun. 18, 2021 for corresponding German Patent Application No. 10 2021 201 264.7.

Korean Office Action dated Dec. 3, 2024 for corresponding Korean Patent Application No. 10-2023-7030460.

* cited by examiner

PHASE CONNECTION BETWEEN AN INVERTER OR CONVERTER AND AN ELECTRIC MACHINE, TOGETHER WITH A METHOD FOR ESTABLISHING AN ELECTRICAL CONNECTION, AND ELECTRICAL DRIVE DEVICE

CROSS-REFERENCE TO RELATED APPLICATIONS

This application claims priority to PCT Application PCT/EP2022/052937, filed Feb. 8, 2022, which claims priority to German Patent Application No. DE 10 2021 201 264.7, filed Feb. 10, 2021. The disclosures of the above applications are incorporated herein by reference.

FIELD OF THE INVENTION

The invention relates to a phase connection for electrically conductively connecting an inverter to a busbar of an electric machine, the phase connection having at least one load busbar, and the load busbar being formed at least in sections from soft-annealed copper. Owing to the load busbar being formed from soft-annealed copper, tolerances in the region of the electrical connection may be compensated for in a simple manner when the inverter and the electric machine are assembled. In addition, the invention relates to an electrical drive device with an inverter and an electric machine, the inverter and the electric machine being electrically conductively connected to one another via the phase connection according to the invention. Furthermore, the invention relates to a method for establishing an electrically conductive connection between an inverter and an electric machine via the phase connection according to the invention.

BACKGROUND OF THE INVENTION

Phase connections between an inverter and an electric machine are known in principle. The known phase connections are used to establish an electrically conductive connection between a busbar of the electric machine and the inverter. A known problem here is that, when the inverter is placed on the electric machine, the electrical connections on both sides are not always precisely aligned with one another. In other words, the need to compensate for a certain tolerance when electrically connecting a conductor of the phase connection to the busbar of the electric machine cannot be ruled out. In order to enable tolerance compensation, the electrical conductors of the phase connection are formed in lamellar manner, at least in sections. In other words, a large number of thin, electrically conductive sheets are arranged next to one another in the longitudinal direction of the conductor, firstly to allow a certain flexibility of the conductor and secondly to provide a certain minimum cross section of the electrical conductor. Known phase connections are this kind are expensive to manufacture.

SUMMARY OF THE INVENTION

One object of the invention is to specify a phase connection between an inverter and an electric machine, which phase connection is established cost-effectively.

The object is achieved by the subject matter described herein. Some examples of the invention are the subject matter of the following description and the drawings, where each feature may represent one aspect of the invention both individually or in combination, unless the description explicitly specifies otherwise.

According to the invention, a phase connection for electrically conductively connecting an inverter or a converter to a busbar of an electric machine is provided, the phase connection having a housing part having a housing wall, the housing wall having a first side and a second side that is different from the first side, and an opening extending between the first side and the second side being formed in the housing wall, and having a load busbar which is routed through the opening and has a first connecting section which is routed beyond the first side and is formed at least in sections from soft-annealed copper and/or contains soft-annealed copper.

In other words, one aspect of the invention is that a phase connection for electrically conductively connecting an inverter or a converter to a busbar of an electric machine is specified. The inverter may also be referred to as a power inverter. The electric machine is in an embodiment an electric machine of an at least partially electrically driven motor vehicle, the electric machine being used in the drive train of the motor vehicle. The electric machine usually has a stator with a stator winding. The phases of the stator winding are routed to a busbar in order to electrically conductively connect the busbar.

The phase connection has a housing part. The housing part may, in an embodiment, be a constituent part of an inverter housing which surrounds the inverter at least in sections. As a rule, the housing part is formed from an electrically insulating material, such as plastic for example. It is further provided that the housing part has a wall. The housing wall forms a first side and a second side. The two sides are different from each other. The first side may face the electric machine, and the second side is directed toward the inverter. The first side and the second side are oriented parallel to one another.

An opening extends through the housing wall between the first side and the second side. The opening is, in and embodiment, an edge-closed passage opening. A load busbar is routed through the opening and has a first connecting section which is routed beyond the first side. The load busbar is electrically conductive. It is provided that the first connecting section is formed at least in sections from soft-annealed copper and/or contains soft-annealed copper. Soft-annealed copper has good or increased deformability and/or reduced rigidity, especially in the cold state, so that the first connecting section may compensate for production-related tolerances in the region of the power connection when the first connecting section is fastened to the busbar of the electric machine. Owing to the increased flexibility of the connecting section, stresses in the connecting section in the region of the opening in the housing wall is reduced. Such a load busbar without a lamellar strip may be produced inexpensively, and therefore the costs of the phase connection is reduced.

Soft-annealed copper is understood to mean a copper material that has a strength of 200 to 240 MPa, the limits being included. The elongation at break of the soft-annealed copper is greater than 38% and the hardness value of the soft-annealed copper is between 45 HB and 55 HB (Brinell hardness).

It is conceivable that the connecting section may be connected to the busbar of the electric machine via a materially bonded connection, such as via a welded connection and/or a soldered connection.

An embodiment of the invention is that the first connecting section has, on a side facing away from the housing wall, a distal end section with a fastening opening. In this way, the load busbar or the first connecting section may be connected in a force-fitting manner to the busbar in a simple manner via a fastening means guided through the fastening opening. The fastening means may be a screw connection, a rivet connection and/or a bolt. In this way, the connection may be released non-destructively for repairs.

In this context, one embodiment of the invention is that the fastening opening is in the form of an elongate hole. The longitudinal direction of the elongate hole extends in a longitudinal direction of the first connecting section here. When the first connecting section is fastened to the busbar by means of the fastening means, stresses in the region of the opening are reduced via the elongate hole in the event of tolerance-related deflection of the first connecting section. Similarly, the stresses in the region of the busbar, which is usually connected to the phases of the stator winding head, are reduced. The winding head may have a brittle, partially glass-like casing and/or coating that is extremely fragile. Consequently, the mechanical influences on the winding head of the stator when the phase connection is fastened to the busbar may therefore also be minimized via the elongate hole in the distal end section.

A embodiment of the invention provides that at least a subregion of the first connecting section between the distal end section and the first side is formed from soft-annealed copper and/or contains soft-annealed copper, and the distal end section has increased strength in relation to the subregion of the first connecting section. Accordingly, it is also conceivable that the entire load busbar, apart from the distal end section, is formed from soft-annealed copper and/or contains soft-annealed copper. The distal end section has higher structural strength and/or rigidity than the subregion of the first connecting section between the first side and the distal end section, which subregion is formed from the soft-annealed copper. The distal end section is formed from a metal, such as from copper. The distal end section is in an embodiment materially bonded to a subregion of the first connecting section. Due to the fact that the distal end section has an increased structural rigidity, a permanent prestressing force is rendered possible when the load busbar is connected in a force-fitting manner to the busbar.

As an alternative to this, an alternate embodiment of the invention is that the load busbar is formed from soft-annealed copper over its entire length. In other words, the entire load busbar, including the distal end section, is formed from the same material and in one piece. It is therefore possible to reduce the costs for the load busbar. Since the clamping force of the fastening means may decrease over a period of time when the load busbar is fastened in a force-fitting manner to the busbar on account of the reduced rigidity of the soft-annealed copper, owing to a relaxation of the material, it may be provided that a spring element is or may be arranged between a head of the fastening means and the distal end and/or between the distal end and the busbar.

A embodiment of the invention is that a cap composed of an electrically conductive material is arranged on the distal end section, the electrically conductive material having increased strength in relation to the load busbar formed from soft-annealed copper. The cap has a fastening opening which is aligned with the fastening opening in the distal end section, so that a fastening means may be routed through the cap and the distal end section in order to be connected to the busbar or a mating bearing. Since the cap has increased strength, a prestressing force of the fastening means may be permanently applied to the cap for fastening the load busbar to the busbar. The cap is formed from copper and/or at least partially contains copper. It is conceivable that the cap is arranged and/or fastened on the distal end section in a materially bonded and/or form-fitting manner.

In an embodiment of the invention, it is provided that the load busbar is connected to the housing wall in a media-tight manner in the opening. A media-tight connection is, in an embodiment, a fluid-tight connection. This may prevent a fluid, for example an oil, from passing from the electric machine, via the phase connection, into the inverter.

According to an embodiment of the invention, it is provided that the load busbar has a rectangular profile with a first width $b_1$ and a second width $b_2$ arranged at a right angle to the first width $b_1$ the first width $b_1$ being smaller than the second width $b_2$. The following applies for the width $b_2$: $2b_1 \leq b_2 \leq 10b_1$, and in an embodiment $3b_1 \leq b_2 \leq 8b_1$. Therefore, it is provided, for example, that the load busbar has a width $b_1$ of 3 mm and a width $b_2$ of 17 mm. In order to compensate for tolerances in the region of the electrical connection when assembling the inverter and the electric machine, the load busbar or the first connecting section is at least partially bent and/or deflected about the weak axis of the load busbar.

According to an embodiment of the invention, it is provided that an end face of the distal end section is beveled and/or inclined at least in sections, or completely. The end face of the distal end section is therefore one end of the load busbar in its longitudinal direction or longitudinal extent. Owing to the beveled or inclined design of the end face, the first connecting section is deflected if, when the inverter is arranged on the electric machine, it strikes the front of the mating piece to be connected.

If a cap composed of an electrically conductive material is arranged on the distal end, it may be provided that an end face of the cap is at least partially, in an embodiment completely, beveled and/or inclined. The end face of the cap is formed on a side facing away from the fastening opening. Owing to the beveled or inclined design of the end face, the first connecting section is deflected if, when the inverter is arranged on the electric machine, it strikes the front of the mating piece to be connected.

The longitudinal direction of the inclined end face of the distal end section or the inclined end face of the cap runs at a right angle to the longitudinal direction of the load busbar. In an embodiment, the longitudinal direction of the inclined end face of the distal end section and/or the end face of the cap runs in the longitudinal direction of the second width $b_2$. Inclined or beveled at least partially and/or in sections means that a section of greater than $0.1 \times b_1$ and less than $0.8 \times b_1$, in another example of greater than $0.2 \times b_1$ and less than $0.7 \times b_1$, and in another example of greater than $0.3 \times b_1$ and less than $0.6 \times b_1$, with respect to the first width $b_1$, is inclined, the limits being included.

It is provided that the first connecting section between the distal end section and the first side of the housing wall has at least one reduction in cross section. It is conceivable that two or more reductions in cross section are provided, which are arranged at a distance from one another in the longitudinal direction of the first connecting section. The plurality of reductions in cross section may be formed on one side and/or in an embodiment on opposite sides of the load busbar. The reduction in cross section serves as a deflection point, so that the connecting section may be deflected in a targeted manner. Stresses, such as in the region of the opening through the housing wall in the region of the distal end, may therefore be reduced when the first connecting section is deflected. The reduction in cross section is, for example, a material recess and/or notch extending over the first width $b_1$ and/or the second width $b_2$. The deflection points in the form of reductions in cross section are space-saving and easy to produce.

As an alternative and/or in addition, an embodiment of the invention may provide that the first connecting section between the distal end section and the first side of the housing wall has an expansion section which has, perpendicularly to the longitudinal direction of the first connecting section, a U-shaped and/or V-shaped configuration. The expansion section may firstly compensate for a length tolerance and additionally serve as a deflection point in order to reduce the stresses when the load busbar is fastened to the busbar in the region of the opening in the housing wall and/or at the distal end section or on the busbar.

The invention additionally relates to an electrical drive device for an at least partially electrically driven motor vehicle, having an inverter, an electric machine with a busbar, and the phase connection according to the invention which electrically conductively connects the inverter and the busbar to one another.

Furthermore, the invention relates to a method for producing an electrical connection between an inverter and a busbar of an electric machine, including the phase connection according to the invention, wherein a second connecting section routed beyond the second side is electrically conductively connected to the inverter, the inverter is placed on a housing of the electric machine, and the first connecting section is electrically conductively connected to a busbar of the electric machine via a fastening means.

Further features and advantages of the present invention can be found in the following exemplary embodiments. The exemplary embodiments are to be understood not as restrictive, but rather as examples. They are intended to enable a person skilled in the art to implement the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The exemplary embodiments will be discussed in more detail with reference to drawings, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
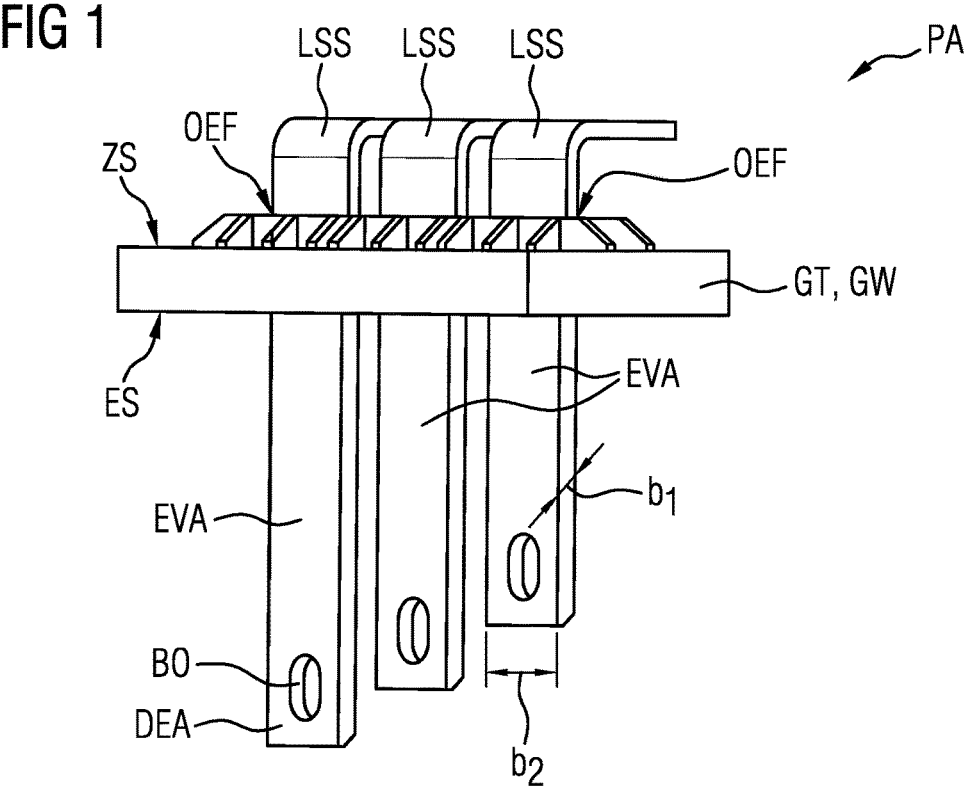
FIG. 1 shows a view of a phase connection according to an exemplary embodiment of the invention.

FIG. 1 shows a three-dimensional view of a phase connection PA for electrically conductively connecting an inverter to a busbar SS of an electric machine. The inverter may also be referred to as a power inverter. The electric machine is, in an embodiment, an electric machine of an at least partially electrically driven motor vehicle, the electric machine being used in the drive train of the motor vehicle. The electric machine usually has a stator with a stator winding. The phases (U, V, W) of the stator winding are routed to the busbar SS in order to electrically conductively connect them.

The phase connection PA has a housing part GT composed of an electrically insulating material, for example a plastic. The housing part GT may be a constituent part of an inverter housing which surrounds the inverter at least in sections. It is provided that the housing part GT has a housing wall GW. The housing wall GW forms a first side ES and a second side ZS. The two sides ES, ZS are different from each other. The first side ES faces the electric machine, and the second side ZS is directed toward the inverter.

An opening OEF extends through the housing wall GW between the first side ES and the second side ZS. There are three openings OEF arranged spaced apart from one another in the present example. The openings OEF are edge-closed passage openings. A load busbar LSS is routed through each opening OEF. Each load busbar LSS has a first connecting section EVA which is routed beyond the first side ES. The load busbars LSS are electrically conductive. It is provided that the first connecting section EVA is formed at least in sections from soft-annealed copper and/or contains soft-annealed copper. Soft-annealed copper has increased deformability, so that the first connecting section EVA compensates for production-related tolerances T when the first connecting section EVA is fastened to the busbar SS of the electric machine. Owing to the increased flexibility of the first connecting section EVA, stresses in the first connecting section EVA in the region of the opening OEF in the housing wall GW are reduced. In addition, such a phase connection PA is produced inexpensively.

The load busbars LSS have a rectangular profile or cross section with a first width $b_1$ and a second width $b_2$ arranged at a right angle to the first width $b_1$, the first width $b_1$ being smaller than the second width $b_2$. In the present case, $4b_1 \le b_2 \le 7b_1$. It may therefore be provided, for example, that the load busbar LSS has a first width $b_1$ of 3 mm and a second width $b_2$ of 17 mm. In order to compensate for tolerances T between the first connecting section EVA and the busbar SS, the load busbar LSS or the first connecting section EVA is bent and/or deflected about the weak axis of the load busbar LSS.

Figure 2:
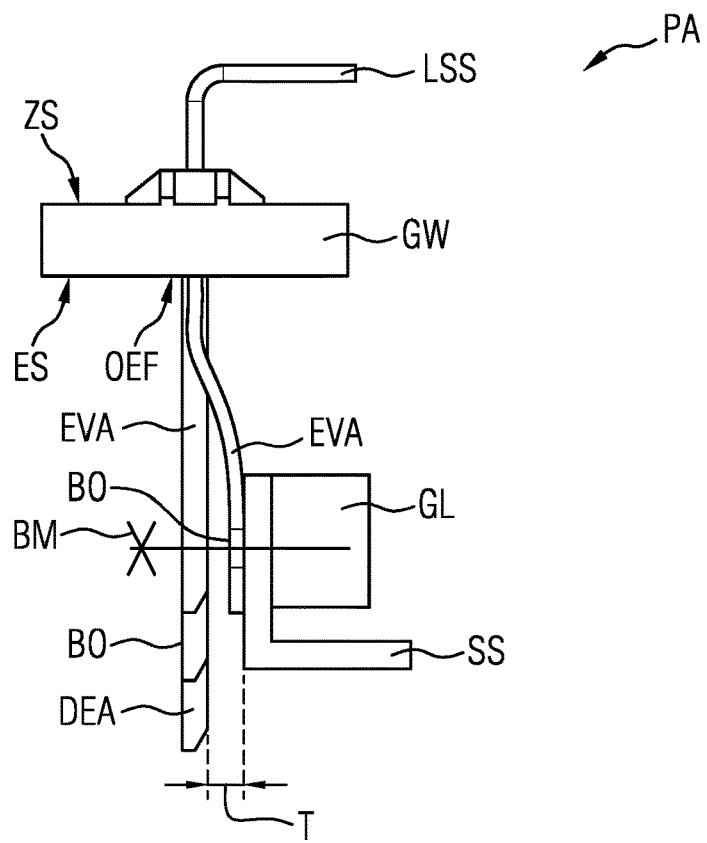
FIG. 2 shows a section through the phase connection for tolerance compensation according to an exemplary embodiment of the invention.

FIG. 2 shows a section through the phase connection PA for tolerance compensation, as is known from FIG. 1. The first connecting section EVA has, on a side facing away from the housing wall GW, a distal end section DEA with a fastening opening BO. A fastening means BM, such as a screw, is routed through the fastening opening BO and the busbar SS and is connected to a mating bearing GL in a force-fitting manner. The force-fitting connection is, for example, a screw connection. A tolerance T between the first connecting section EVA and the busbar SS is compensated for in a simple manner via the flexible first connecting section EVA between the first side ES and the distal end section DEA by fastening the distal end section DEA to the busbar SS.

The fastening opening BO is in the form of an elongate hole. The longitudinal direction of the elongate hole extends in a longitudinal direction of the first connecting section EVA here. When the first connecting section EVA is fastened to the busbar SS by means of the fastening means BM, stresses in the region of the opening OEF are reduced via the elongate hole in the event of tolerance-related deflection of the first connecting section EVA. Similarly, the stresses in the region of the busbar SS, which is usually connected to the phases of the stator winding head, are reduced.

Figure 3:
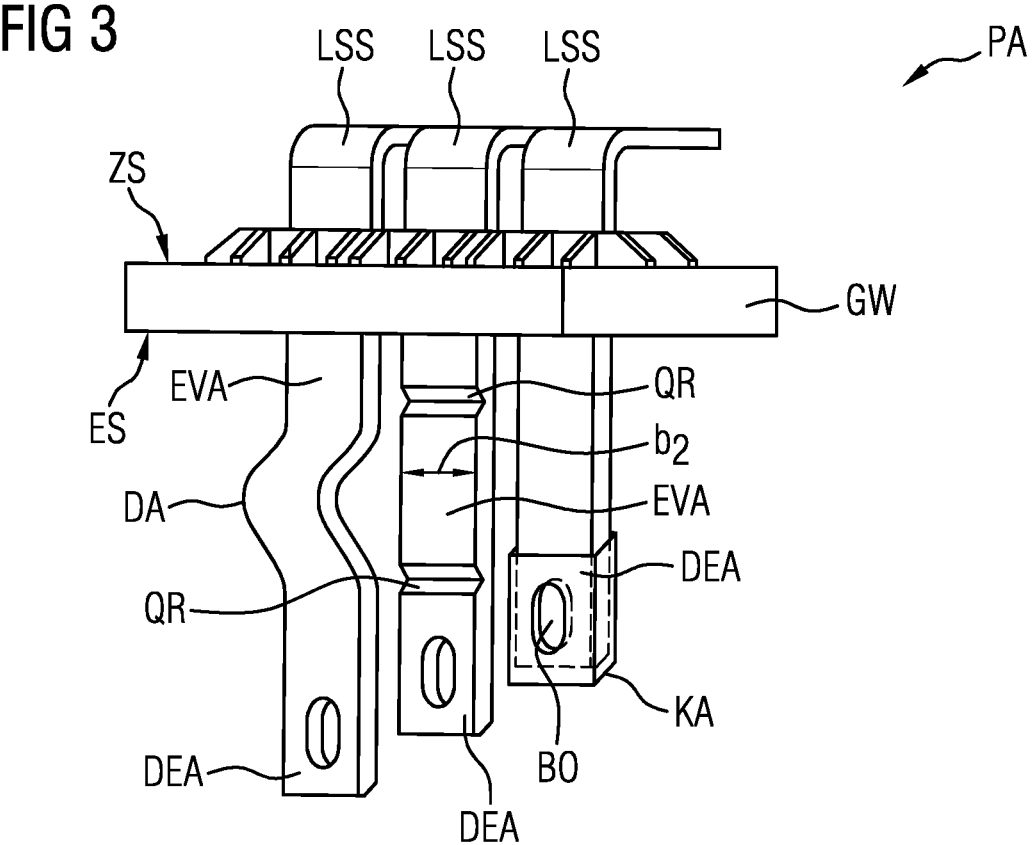
FIG. 3 shows a view of a phase connection with load busbars, which are designed in different ways.

FIG. 3 shows a view of the phase connection PA with three load busbars LSS formed differently. It is conceivable that a phase connection PA may be provided with different load busbars LSS. As a rule, however, the phase connection PA has load busbars LSS which are formed in the same way. However, they may vary in length.

In the case of the left-hand-side load busbar LSS, it is provided that the first connecting section EVA between the distal end section DEA and the first side ES of the housing wall GW has an expansion section DA which has, perpendicularly to the longitudinal direction of the connecting section, a U-shaped and/or V-shaped configuration. The expansion section DA firstly compensates for a length tolerance and additionally serves as a deflection point in order to reduce the stresses when the load busbar LSS is fastened to the busbar SS in the region of the opening OEF in the housing wall GW and/or at the distal end section DEA or on the busbar SS.

In the case of the centrally arranged load busbar LSS, it is provided that the first connecting section EVA between the distal end section DEA and the first side ES of the housing wall GW has at least one reduction QR in cross section. As shown, the reduction QR in cross section is a notch which extends along the second width $b_2$ of the load busbar LSS. Two reductions QR in cross section which are spaced apart from one another in the longitudinal direction of the load busbar LSS are arranged or formed in the present case. The reductions QR in cross section are arranged on one side of the first connecting section EVA. However, it is also conceivable that the reductions QR in cross section are arranged on opposite sides of the first connecting section EVA. The reduction QR in cross section serves as a deflection point, so that the first connecting section EVA is deflected in a targeted manner. Stresses, for example in the region of the opening OEF through the housing wall GW and/or in the region of the distal end section DEA, are therefore reduced when the first connecting section EVA is deflected. The deflection points in the form of reductions QR in cross section are space-saving and easy to produce.

In the case of the right-hand-side load busbar LSS, it is provided that the load busbar LSS is formed from soft-annealed copper over its entire length. In other words, the entire load busbar LSS, including the distal end section DEA, is formed from the same material and in one piece. It is therefore possible to reduce the costs for the load busbar LSS. A cap KA composed of an electrically conductive material is arranged on the distal end section DEA, the electrically conductive material having increased strength in relation to the load busbar LSS formed from soft-annealed copper. The cap KA has a fastening opening BO which is aligned with the fastening opening BO in the distal end section DEA, so that a fastening means BM may be routed through the cap KA and the distal end section DEA in order to be connected to the busbar SS. Since the cap KA has increased strength, a prestressing force of the fastening means BM may be permanently applied to the cap KA for fastening the load busbar LSS to the busbar SS. The cap KA is in an embodiment formed from copper and/or at least partially contains copper. It is conceivable that the cap KA is arranged and/or fastened on the distal end section DEA in a materially bonded and/or form-fitting manner.

Figure 4:
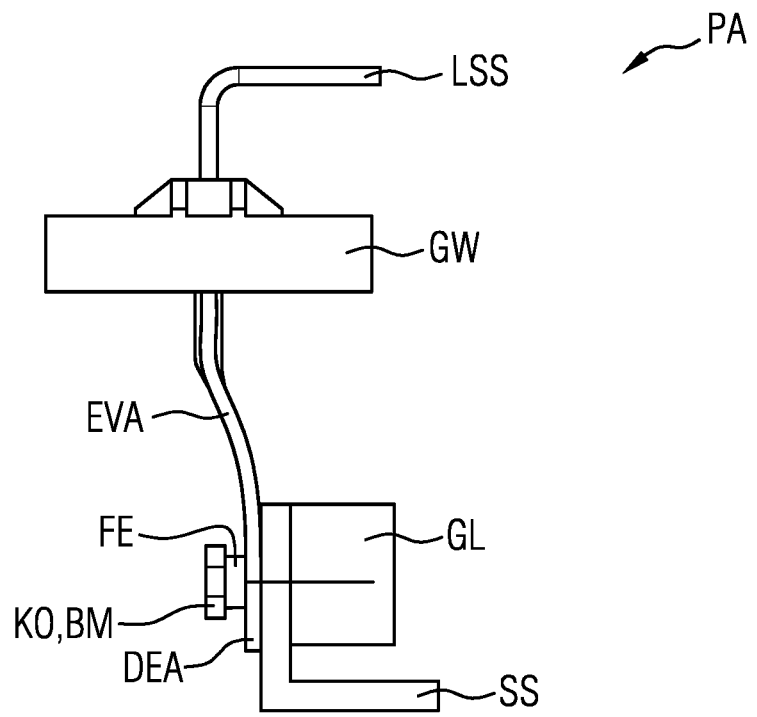
FIG. 4 shows a section through the phase connection for tolerance compensation with a screw connection and a spring element.

FIG. 4 shows a section through the phase connection PA, in which the entire load busbar LSS is formed from soft-annealed copper and/or at least contains soft-annealed copper. This also applies to the region of the distal end section DEA. In the case of force-fitting fastening of the load busbar LSS to the busbar SS, the clamping force of the fastening means BM may decrease due to the reduced rigidity of the soft-annealed copper. It is therefore provided that a spring element FE is arranged between a head KO of the fastening means BM and the distal end section DEA.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A phase connection for electrically conductively connecting an inverter or converter to a busbar of an electric machine, comprising:
 a housing part, further comprising:
  a housing wall, the housing wall having a first side and a second side that is different from the first side; and
  an opening extending between the first side and the second side being formed in the housing wall;
 a load busbar which is routed through the opening and has a first connecting section which is routed beyond the first side and is formed at least in sections from soft-annealed copper and/or contains soft-annealed copper, the first connecting section further comprising:
  a distal end section (DEA) on a side of the first connecting section facing away from the housing wall, the distal end section (DEA) having a fastening opening (BO);
 a cap (KA), comprising an electrically conductive material, arranged on the distal end section such that the cap is adjacent to and in contact with at least two surfaces of the distal end section.

2. The phase connection of claim 1, the fastening opening further comprising an elongate hole.

3. The phase connection of claim 1, wherein at least a subregion of the first connecting section between the distal end section and the first side is formed from soft-annealed copper, and the distal end section has increased strength in relation to the subregion of the first connecting section.

4. The phase connection of claim 1, further comprising:
 wherein the electrically conductive material has increased strength in relation to the load busbar formed from soft-annealed copper.

5. The phase connection of one of claim 1, further comprising an end face of the distal end section is beveled and/or inclined at least in sections.

6. The phase connection of claim 1, the first connecting section between the distal end section and the first side of the housing wall further comprising at least one reduction in cross section.

7. The phase connection of claim 1, the first connecting section between the distal end section and the first side of the housing wall further comprising an expansion section which has, perpendicularly to the longitudinal direction of the first connecting section, a U-shaped and/or V-shaped configuration.

8. The phase connection of one of claim 1, wherein the load busbar is connected to the housing wall in a media-tight manner in the opening.

9. The phase connection of claim 1, the load busbar further comprising a rectangular profile with a first width, and a second width arranged at a right angle to the first width, the first width being smaller than the second width.

10. The phase connection of claim 1, wherein the load busbar is formed from soft-annealed copper.

11. An electrical drive device for an at least partially electrically driven motor vehicle, comprising:
an inverter;
an electric machine with a busbar; and
a phase connection, further comprising:
   a housing part having a housing wall, the housing wall having a first side and a second side that is different from the first side, and an opening extending between the first side and the second side being formed in the housing wall;
   a load busbar which is routed through the opening and has a first connecting section which is routed beyond the first side and is formed at least in sections from soft-annealed copper and/or contains soft-annealed copper;
   a distal end section (DEA) being part of the first connecting section, the distal end section on a side of the first connecting section facing away from the housing wall, the distal end section (DEA) having a fastening opening (BO);
   a cap (KA), comprising an electrically conductive material, arranged on the distal end section such that the cap is adjacent to and in contact with at least two surfaces of the distal end section;
wherein the phase connection electrically conductively connects the inverter and the busbar to one another.

12. A method for establishing an electrical connection between an inverter and a busbar of an electric machine, comprising the steps of:
providing a phase connection;
providing a housing part being part of the phase connection, the housing part having a housing wall, the housing wall having a first side and a second side that is different from the first side, and an opening extending between the first side and the second side being formed in the housing wall;
providing a load busbar being part of the phase connection, the load busbar is routed through the opening and has a first connecting section which is routed beyond the first side and is formed at least in sections from soft-annealed copper and/or contains soft-annealed copper;
providing a distal end section (DEA) on a side of the first connecting section facing away from the housing wall, the distal end section (DEA) having a fastening opening (BO);
providing a cap (KA), comprising an electrically conductive material, arranged on the distal end section such that the cap is adjacent to and in contact with at least two surfaces of the distal end section; and
providing a second connecting section routed beyond the second side is electrically conductively connected to the inverter, the inverter is placed on a housing of the electric machine, and the first connecting section is electrically conductively connected to a busbar of the electric machine via a screw.

* * * * *